N. BOCH.
Process of Manufacturing Porcelain Door-Knobs.
No. 168,826. Patented Oct. 19, 1875.

WITNESSES

INVENTOR
Nicholas Boch

UNITED STATES PATENT OFFICE.

NICHOLAS BOCH, OF BROOKLYN, NEW YORK.

IMPROVEMENT IN PROCESSES OF MANUFACTURING PORCELAIN DOOR-KNOBS.

Specification forming part of Letters Patent No. 168,826, dated October 19, 1875; application filed May 20, 1875.

*To all whom it may concern:*

Be it known that I, NICHOLAS BOCH, of Brooklyn, in the county of Kings and State of New York, have invented certain new and useful Improvements in Porcelain Door-Knobs; and I do hereby declare that the following is a full, clear, and exact description thereof, and of their construction and operation, reference being had to the accompanying drawings, and to the letters of reference marked thereon, and making a part of this specification.

My invention consists in an improved mode of forming the knob and shank, when such knob and shank are both made of porcelain or composition, whereby they can be manufactured more cheaply and perfectly than has heretofore been possible.

Figure 1:
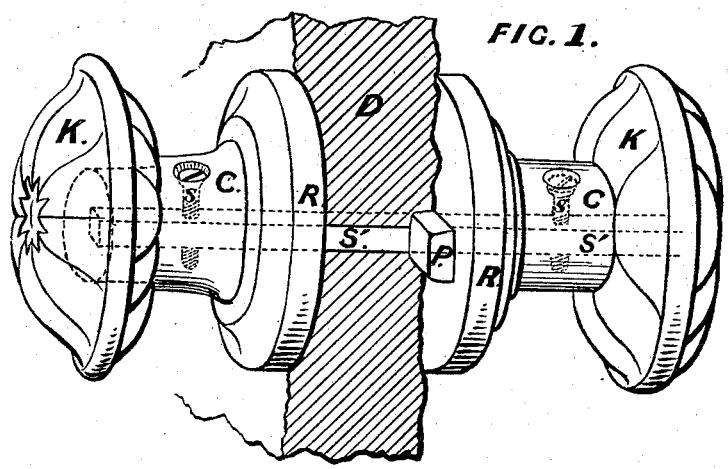
Figure 2:
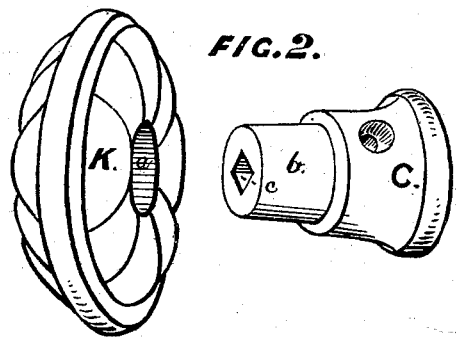
Figure 3:
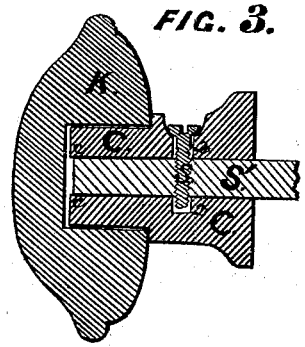
Figure 4:
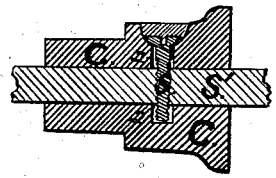
Figure 5:
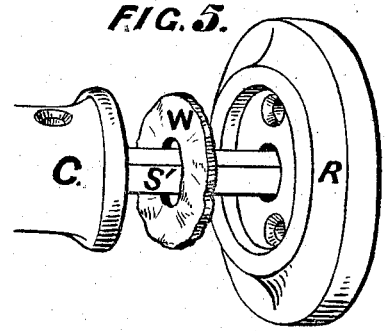
Figure 6:
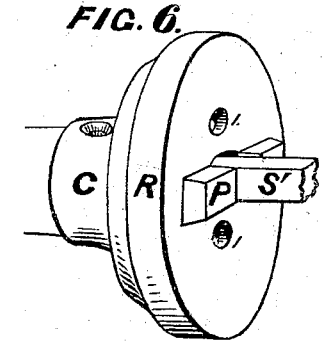

Figure 1 represents my improved knob as attached to a door, the spindle and screws being shown by dotted lines. Fig. 2 shows the knob and shank as separately molded. Fig. 3 is a vertical section through the knob and shank, spindle, and screw. Fig. 4 is a like section through the shank, spindle, and screw. Fig. 5 shows the washer between the shank and rosette. Fig. 6 shows the inner face of the rosette.

The knob K and shank C are both made of clay or composition, and are molded and baked in the usual manner. These parts, however, instead of being made as heretofore, (molded in one piece,) are molded and baked separately, the knob by itself, and the shank by itself, a cavity, $a$, being made in the knob to receive the end $b$ of the shank, which is shaped so as to substantially fill the cavity $a$. Such cavity in the knob, as well as the central cavity $c$ in the shank for the spindle, are made while the parts are being molded. By thus forming the knob and shank separately they can be made much more rapidly and cheaply, and in more perfect form, than when molded together. After having been thus molded they are baked in the usual manner, and finished, and then the hole drilled in the shank to take the screw, which secures the shank to the spindle S. After having been thus baked and finished separately, the knob and shank are fitted together, as shown in Fig. 3, and the enamel composition spread over them, and the whole is then placed in the furnace to liquefy such enamel, and which, when melted, flows around and over part of the knob and shank and between them, so as to cement or join the two together as completely and strongly as if they had been made together from the same piece of material, and in one and the same mold. By being thus molded and baked separately, the knob and shank can be finished or turned off, and the screw-hole drilled with much less liability of breaking and injury to the parts than when the shank and the knob are molded together or in one piece.

This method of connecting together the knob and its shank by means of the melted composition, which at the same time forms the enameled surface of the knob and shank, secures the most perfect and complete uniting of the two parts, as the melted flux will flow into every part of the space or opening between the two, and make them, in fact, homogenous and solid, and such uniting is also effected at the same time, and by the same process, in and by which the parts are enameled, and without requiring any particular or specific manipulation or treatment for connecting the two parts together.

The rosette R is made substantially as heretofore, except that upon its inner face or surface there are made two or more lugs or projections, P, which are intended to be let into the door, so as to hold it more fixedly. Such rosette is fastened by screws 1 1, in the usual manner. Between the shank C and rosette R there may be used an india-rubber washer, W, instead of the metallic rings or springs, such as have heretofore been used. Such washer should be a little thicker than the space to be filled, so as to require some slight compression to have the parts better held together. The shank C is also so made as to permit the knob K to be secured to the spindle S' in a most effective manner.

As heretofore generally constructed the knob, whether the shank is made of metal or of any other material, has been secured to the spindle by a headed rivet, or by means of a screw, which passes through one side of the shank and into the spindle, but not passing through such spindle. In such construction every motion of the spindle, particularly if such spindle did not exactly fit and fill its socket, tended to loosen the screw, causing it to work out, and very often get lost, thereby rendering the knob practically useless.

All these defects are remedied in the following manner: The hole 2, made in the shank to receive the screw S, which holds and fastens the spindle, instead of being made only in or through one side of the shank, as heretofore, is extended beyond the spindle-cavity $c$ into the other side of the shank, as shown in the Figs. 1, 3, and 4, so as to provide for the insertion of the longer screw, which will pass through the spindle, and extend beyond it on each side. The spindle is thus held much more securely, and the movements of the knob and of such spindle do not have any tendency to loosen or displace such screw; and the screw can also be countersunk in its cavity, so as to permit a covering of cement of any kind to be placed over its head, which not only prevents the possibility of such screw getting out, but also entirely hides it.

What is claimed is—

The mode or process of manufacturing porcelain door-knobs, substantially as described, by forming or molding the knob and its shank separately, and uniting or cementing them together in the process of enameling by the fluxing of the material used for enameling.

NICHOLAS BOCH.

Witnesses:
S. D. LAW,
HUGH JONES.